US00RE47926E

(19) United States
(12) Reissued Patent
Liu et al.

(10) Patent Number: US RE47,926 E
(45) Date of Reissued Patent: Mar. 31, 2020

(54) SERVER-BASED POSITIONING SYSTEM ARCHITECTURE

(71) Applicant: MARVELL WORLD TRADE LTD, St. Michael (BB)

(72) Inventors: Bochih Liu, Shanghai (CN); Zhike Jia, Fremont, CA (US); Yuan Ren, Shanghai (CN); Jing Yu, Shanghai (CN); Jian Chen, Shanghai (CN); Xing Zhao, Shanghai (CN)

(73) Assignee: Marvell World Trade Ltd., St. Michael (BB)

(21) Appl. No.: 15/927,222

(22) Filed: Mar. 21, 2018

Related U.S. Patent Documents

Reissue of:
(64) Patent No.: 9,578,618
Issued: Feb. 21, 2017
Appl. No.: 14/490,808
Filed: Sep. 19, 2014

U.S. Applications:
(60) Provisional application No. 61/892,649, filed on Oct. 18, 2013.

(51) Int. Cl.
*H04W 64/00* (2009.01)
*H04W 4/029* (2018.01)

(52) U.S. Cl.
CPC ..... *H04W 64/00* (2013.01); *H04W 4/029* (2018.02)

(58) Field of Classification Search
None
See application file for complete search history.

(56) References Cited

U.S. PATENT DOCUMENTS 7,672,675 B2 * 3/2010 Pande ..... G01S 5/0252 455/456.1
9,042,917 B2 * 5/2015 Edge ..... H04W 64/00 342/453

(Continued)

FOREIGN PATENT DOCUMENTS

WO WO2007/056738 5/2007

*Primary Examiner* — John M Hotaling

(57) ABSTRACT

Systems and methods are provided for location determination in wireless communication networks. A client device with a location provider installed is configured to provide location data to a data engine server and to obtain location service from a positioning engine server or the location provider itself. The location provider based on one or more components implements the reference data delivery function and the client location determination function. The data engine server is configured to process the location data received from one or more client devices and maintain a location database. The data engine server based on one or more components implements the reference data retrieval function, station position calculation function, reference data management function, and assistance data delivery function, as it interacts with the client device. The positioning engine server is configured to process the location request data received from one or more client devices and calculate the locations of the client devices. The positioning engine server based on one or more components implements the positioning data retrieval function and device position calculation function, as it interacts with the client device. The location database stores the previously obtained location data.

18 Claims, 4 Drawing Sheets

(56) References Cited

U.S. PATENT DOCUMENTS

| | | | | |
|---|---|---|---|---|
| 2007/0121560 | A1* | 5/2007 | Edge | H04W 64/00 370/338 |
| 2007/0129085 | A1* | 6/2007 | Kennedy, Jr. | G01S 5/0205 455/456.2 |
| 2008/0108371 | A1* | 5/2008 | Alizadeh-Shabdiz | G01S 5/02 455/456.1 |
| 2008/0176583 | A1 | 7/2008 | Brachet et al. | |
| 2009/0112517 | A1* | 4/2009 | Hsyu | G01S 5/021 702/181 |
| 2011/0065457 | A1* | 3/2011 | Moeglein | G01S 5/021 455/456.6 |
| 2011/0171912 | A1* | 7/2011 | Beck | G01S 5/0221 455/67.11 |
| 2011/0250902 | A1* | 10/2011 | Huang | H04W 4/02 455/456.1 |
| 2012/0127890 | A1* | 5/2012 | Islam | G01S 5/0205 370/252 |
| 2012/0188938 | A1* | 7/2012 | Venkatraman | H04W 64/003 370/328 |
| 2013/0203447 | A1* | 8/2013 | Hannan | H04W 64/00 455/456.5 |

* cited by examiner

SERVER-BASED POSITIONING SYSTEM ARCHITECTURE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This [disclosure claims] *is a reissue of U.S. Pat. No. 9,578,618, issued Feb. 21, 2017 on U.S. patent application Ser. No. 14/490,808, filed Sep. 19, 2014, which claimed* priority to and benefit from U.S. Provisional Patent Application No. 61/892,649, filed on Oct. 18, 2013, the entirety of which is incorporated herein by reference.

FIELD

This disclosure relates generally to location determination. More specifically, the disclosure relates to system for server based location determination in wireless communication networks.

BACKGROUND

A wireless mobile device can include one or more location-aware applications that are configured to perform location based tasks such as store finding and transit routing. Location-aware applications depend on positioning method to determining a location of a wireless mobile device. A positioning method is configured to incorporate a satellite positioning system receiver in a wireless mobile device and to specify a real-time location of the wireless mobile device by use of only signals from satellites. Satellite based positioning can provide high accuracy, but require a positive line of sight between satellites and the wireless mobile device. In open sky areas where satellite positioning signals seldom are obstructed, the wireless mobile device can receive sufficient line of sight signals from satellites. However, satellite based positioning is largely ineffective while a wireless mobile device is within shadow areas. Further, receiving and processing satellite positioning signals may consume substantial energy and hence shorten battery duration.

SUMMARY

In accordance with the teachings described herein, a system for location determination includes a location provider coupled to a client device that performs the reference data delivery function that generates location data and provides location data to a data engine server via a data management communication interface. The system also includes a data engine server that performs the reference data retrieval function that receives location data, forms location data in a group associated with the wireless station, identifies wireless station in a wireless station information table, excludes one or more outliers from the location data, extracts historical location data from the location database, and combines the location data with the historical location data; performs the station position calculation function that determines an estimated location of a wireless station and determines an estimated uncertainty associated with the estimated location of the wireless station, and determines the coverage area length of a wireless station and the transmission signal range of a wireless station; and performs the reference data management function that logically manages location data refinement and location data distribution. The system further includes a location database that stores the location data, each location data associating position information of a location with an identifier of the wireless station for providing wireless communication at the location and the strength of a signal received at the location.

In one embodiment, a system for location determination includes a location provider coupled to the client device that performs the reference data delivery function that generates location request data and provides location request data to a positioning engine server via a position determination communication interface. The system also includes a positioning engine server that performs the positioning data retrieval function that receives location request data, identifies the wireless station in a wireless station information table, extracts a group of location data associated with the wireless station from the location database, and selects a subset in a group of the location data for the wireless station; and performs the device position calculation function that determines a location of a client device based on the location data in the selected subset and determines an estimated uncertainty associated with the determined location of the client device.

In another embodiment, a system for location determination includes an assistance data information table that stores the assistance data, each assistance data including an identifier of a wireless station, position information of a location for the wireless station, the polynomial coefficients, and a workable range of strength of the signal. The system also includes a data engine server that performs the assistance data delivery function that determines assistance data based on location data in the location database, retrieves a set of assistance data from the assistance data information table, and provides the set of assistance data to the client device. The system further includes a location provider coupled to the client device that performs the reference data delivery function that receives the set of assistance data, stores the set of assistance data in a memory, generates location request data, and provides location request data to the client location determination function; and performs the client location determination function that receives location request data, identifies the wireless station in a memory, extracts assistance data associated with the wireless station from the memory, and determines a location of the client device.

In accordance with the teachings described herein, a method for location determination includes performing the reference data delivery function using a location provider coupled to the client device that comprises generating location data and providing location data to a data engine server via a data management communication interface. The method also includes: performing the reference data retrieval function using the data engine server that comprises receiving location data, forming location data in a group associated with the wireless station, identifying the wireless station in a wireless station information table, excluding one or more outliers from the location data, extracting historical location data from the location database, and combining the location data with the historical location data; performing the station position calculation function using the data engine server that comprises determining an estimated location of a wireless station, determining an estimated uncertainty associated with the estimated location of the wireless station, and determining the coverage area length of a wireless station and the transmission signal range of a wireless station; and performing the reference data management function using the data engine server that comprises logically managing location data refinement and location data distribution. The method further includes storing the location data using a location database, each location data associating position information of a location with an identifier of the wireless station for providing wireless communication at the location and the strength of a signal received at the location.

In one embodiment, a method for location determination includes: performing the reference data delivery function using a location provider coupled to the client device that comprises generating location request data and providing location request data to a positioning engine server via a position determination communication interface. The method also includes: performing the positioning data retrieval function using the positioning engine server that comprises receiving location request data, identifying the wireless station in a wireless station information table, extracting a group of location data associated with the wireless station from the location database, and selecting a subset in a group of the location data for the wireless station; and performing the device position calculation function using the positioning engine server that comprises determining a location of a client device based on the location data in the selected subset and determining an estimated uncertainty associated with the determined location of the client device.

In another embodiment, a method for location determination includes storing the assistance data using an assistance data information table, each assistance data including an identifier of a wireless station, position information of a location for the wireless station, the polynomial coefficients, and a workable range of strength of the signal. The method also includes: performing the assistance data delivery function using a data engine server that comprises determining assistance data based on location data in the location database, retrieving a set of assistance data from the assistance data information table, and providing the set of assistance data to the client device. The method further includes: performing the reference data delivery function using a location provider coupled to the client device that comprises receiving the set of assistance data, storing the set of assistance data in a memory, generating location request data, and providing location request data to the client location determination function; and performing the client location determination function using the location provider that comprises receiving location request data, identifying the wireless station in a memory, extracting assistance data associated with the wireless station from the memory, and determining a location of the client device.

DETAILED DESCRIPTION

This disclosure describes a system architecture that provides a hosted service model for accessing the servers to offer always-on location awareness. The system architecture is supported by a network of server based assistances that strengths in cellular and WiFi technologies to augment the positioning capability of a client device. The system architecture provides location services that can be categorized into server-generated services and client-generated services. The server-generated services are services, which generate position information of a location within the server based positioning system. The client-generated services are services, which generate position information of a location within the client device.

Figure 1:
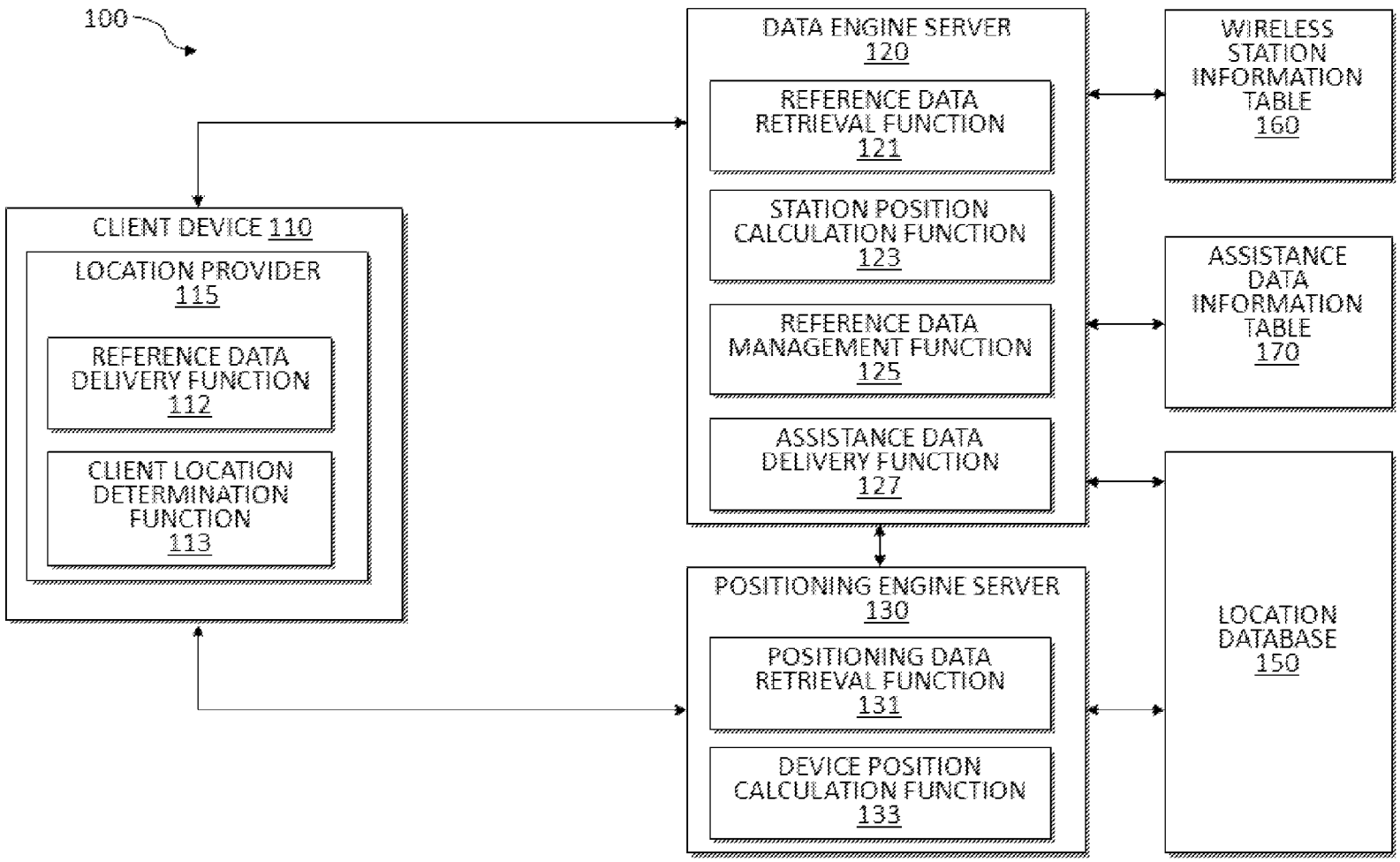
FIG. 1 is an example diagram showing a server based positioning system architecture according to an embodiment of the disclosure.

FIG. 1 is an example diagram showing a server based positioning system architecture 100 according to an embodiment of the disclosure. As shown in FIG. 1, system architecture 100 can include a series of elements, each of which acts to provide specific functionality. These elements may include software which is stored in a storage and then executed on a processor to provide the functionality, hardware which is adapted to provide the element's functionality, or a combination of software and hardware which is working together to provide the element's functionality. The depicted geometry may be adapted to illustrate any one of the exemplary diagrams with reference to FIGS. 2 through 4, or any number of other processes within the scope of this disclosure. More specifically, the system architecture 100 consists of four components: the client device 110, the data engine server 120, the positioning engine server 130, and the location database 150.

The client devices 110 can be any type of wireless mobile devices, such as smart phone, laptop computer, tablet computer, wearable electronic device, and the like that are configured to incorporate functions of a satellite positioning system receiver (not shown), of a cellular transceiver (not shown), and/or a wireless transceiver (not shown). The satellite positioning system receiver may provide position information of a location by receiving satellite signals from at least four satellites. Position information of the location relates generally to geographic coordinates that include a latitude coordinate, a longitude coordinate, and an altitude coordinate of the client devices 110. In an example, position information of the location is represented as a pair of a latitude coordinate and a longitude coordinate. The cellular transceiver may communicate with one or more cellular stations according to various cellular technologies, such as global system for mobile (GSM), code division multiple access (CDMA), wideband code division multiple access (WCDMA), Time Division-Synchronous Code Division Multiple Access (TD-SCDMA), long term evolution (LTE), and the like to provide fingerprints of the cellular communication at a location. The wireless transceiver may communicate with one or more access points according to various communication protocols, such as an Institute of Electrical and Electronics Engineers (IEEE) 802.11 based protocol (e.g., WiFi network) or an IEEE 802.15 based protocol (e.g., BLUETOOTH network), and the like to provide fingerprints of the wireless communication at a location. The fingerprints include an identifier of a wireless station (e.g., a cellular station or an access point) that covers communication at the location and a characteristic of a wireless signal received at the location. In an example, the characteristic of a wireless signal received at the location can be a signal strength indicator received at the location. In another example, the characteristic of a wireless signal received at the location can be a round trip time of signal received at the location.

The client device 110 is installed with a location provider 115 for positioning. In an example, a client device with the location provider installed may provide location data to the data engine server 120. In another example, a client device with the location provider may obtain location service from the positioning engine server 130, or the location provider itself. The location provider 115 may include a plurality of suitable components (not shown), such as a data retriever, a data processor, a location estimator, and the like, each of which acts to provide specific functionality. The location provider 115 based on the plurality of suitable components performs the Reference Data Delivery Function (RDDF) 112 and the Client Location Determination Function (CLDF) 113. According to an embodiment of the disclosure, while a user of the client device powers up the satellite positioning system receiver to allow the client device to provide direction information on a trip, the RDDF 112 can perform functions of generating location data, of delivering location data. The location data can be generated based on the satellite based location determination of the client device, the capability of the client device, and the communicated network of the client device. Each location data includes position information of a location, an identifier of a wireless station for providing wireless communication connection at the location, and a characteristic of a wireless signal received at the location. When satellite based location determination is available to the client device, the RDDF 112 may provide location data to the data engine server 120 through a network communication connection. The communication connection can be software protocol for implementing communication protocol, such as the Transmission Control Protocol/Internet Protocol (TCP/IP), Hypertext Transfer Protocol (HTTP), and the like.

According to another embodiment of the disclosure, while a user of the client device does not power up the satellite positioning system receiver, but has a need of knowing its location, the RDDF 112 can perform functions of generating location request data, of delivering location request data. The location request data can be generated based on the capability of the client device and the communicated network of the client device. In an example, when satellite based location determination is not available to the client device, the RDDF 112 may provide location request data to the positioning engine server 130 through the network communication connection in order to obtain a location determination (i.e., a server-generated services). In another example, when satellite based location determination is not available to the client device, the RDDF 112 may provide location request data to the CLDF 113 in order to obtain a location determination (i.e., a client-generated services). The location request data is used for calculating a location of the client device 110. Each location request data includes an identifier of a wireless station for providing wireless communication connection at the location and a characteristic of a wireless signal received at the location.

The CLDF 113 can perform function of calculating a location of the client device 110. One or more of the positioning calculation modes may be supported. In an example, when the location request data includes an identifier of a cellular station for providing wireless communication connection at the location and a characteristic of a wireless signal received at the location, the cellular network positioning mode is supported. In another example, when the location request data includes an identifier of an access point for providing wireless communication connection at the location and a characteristic of a wireless signal received at the location, the WiFi network positioning mode is supported. The CLDF 113 determines a location of the client device 110 using locations of the wireless stations to which the client device can communicate wirelessly, by triangulating its position based on the characteristics of the wireless signals received at the location (e.g., the strength of the signals received at the location) from the wireless stations.

The data engine server 120 is configured to process the location data received from one or more client devices and maintain the location database 150. The data engine server 120 may include a plurality of suitable components (not shown), such as a data retriever, a data processor, a data manager, a location estimator, and the like, each of which acts to provide specific functionality. The data engine server 120 based on the plurality of suitable components performs the Reference Data Retrieval Function (RDRF) 121, Station Position Calculation Function (SPCF) 123, Reference Data Management Function (RDMF) 125, and Assistance Data Delivery Function (ADDF) 127, as it interacts with the client device 110.

The RDRF 121 can perform function of retrieving location data from the location database 150. According to an embodiment of the disclosure, when the client devices 110 send messages carrying location data from different locations to the data engine server 120 through the network communication connection, the RDRF 121 receives messages carrying location data and forms the location data in a group associated with the wireless station based on time periods. If the wireless station can be identified as an entry in a wireless station information table 160, the RDRF 121 extracts historical location data from the location database 150. If none of the entries in the wireless station information table 160 identifies the detected wireless station, a new entry in the wireless station information table 160 can be generated. The wireless station information table 160 used as index to the location database 150 includes a first wireless station information table for a cellular network and a second wireless station information table for a WiFi network.

The RDRF 121 can perform function of processing location data. According to an embodiment of the disclosure, the RDRF 121 analyzes the location data, excludes one or more outliers from the location data, and combines the location data with the historical location data outputted from the location database 150.

The SPCF 123 can perform function of calculating an estimated location of a wireless station. According to an embodiment of the disclosure, the SPCF 123 uses the data points in a particular set in the group of the location data to determine an estimated location of a wireless station. Specifically, the location estimation can include assigning a weight to each of locations of the client device (i.e., each of satellite based locations of the client device) and averaging the weighted locations as a geographic location of the wireless station. Assigning a weight to each of locations can include assigning a weight to each of latitudes and longitudes of locations in the particular set. The weight of a location can be determined by distance. In weighting the location using the distance, a greater distance between client device and the wireless station can provide a lower weight of location of the client device. Calculating the average location can include calculating an average of weighted latitudes and weighted longitudes of locations in the particular set, and designating a position at the calculated average latitude and longitude as the average location. The estimated location need not correspond to the physical geographic location of the wireless station. Based on the locations of client device in the particular set, an estimated uncertainty associated with the estimated location of the wireless station can be calculated by applying circular error probable (CEP) theory to calculate 95% radius of the estimated location of the wireless station. A 95 percent reflects a confidence of estimate. The uncertainty value can differ from wireless station to wireless station, based on the distribution pattern of the locations in the particular set (e.g., number of the locations, density of the locations, and location concentration area in the wireless stations). In an example, an uncertainty value can be sufficiency small where the client devices are highly concentrated. Further, the SPCF 123 can calculate the coverage area length of a wireless station and the transmission signal range of a wireless station according to the data points in the group of the location data.

The RDMF 125 can perform function of managing location data from the location database 150. The RDMF 125 logically manages location data refinement and location data distribution. In an example of managing location data refinement, the RDMF 125 compares the location-related parameter (e.g., the coverage area length of a wireless station) with parameter threshold and determines whether to refine the location data based on the comparison. In order to refine the location data, the RDMF 125 selects one or more outliers based on cluster calculations. Outliers can be clusters that may contain junk data to be removed. The cluster calculation uses cluster centers to model the group of the location data via iterative refinement approach. In another example of managing location data distribution, the RDMF 125 assigns the group of the location data into a plurality of subsets in accordance with clustering boundaries of subsets. Then, the RDMF 125 calculates a cumulative distribution function (CDF) value of the subset based on the population distribution in the subset. When the CDF values for the subsets are in a range, the subsets are configured to possibly have relatively uniform population across the subsets, and when a CDF value for a subset is out of the range, the RDMF 125 uses suitable algorithms to determine the clustering boundary values to re-define the subsets in order to achieve relatively uniform population across the subsets for the group of the location data.

The ADDF 127 can perform functions of determining assistance data, of delivering assistance data. Each assistance data includes an identifier of a wireless station, position information of a location for the wireless station, the polynomial coefficients, and a workable range of characteristics of wireless signal. Position information of a location for the wireless station is determined by SPCF 125. The ADDF 127 uses polynomial regression method to train polynomial coefficients based on characteristics of wireless signals in the group of the location data in the location database 150. The ADDF 127 determines the workable range of characteristics of wireless signal based on signal-versus-distance relationship. The assistance data will be used as input to the CLDF 113 for the calculation of a location of the client device 110. For an example, the polynomial coefficients can be used to relate to a distance between a client device and the wireless station when a characteristic of wireless signal received at the location is within the workable range. The CLDF 113 determines a location of the client device 110 using locations of the wireless stations to which the client device can communicate wirelessly, by triangulating its position based on the related distances associated with the wireless stations. The ADDF 127 stores the determined assistance data in an assistance data information table 170. The assistance data information table 170 may include a first assistance data information table for a cellular network and a second assistance data information table for a WiFi network.

The ADDF 127 can from the assistance data information table 170 retrieve a set of assistance data by defining a geographical area based on a location of the client device 110. The geographical area can be depicted by a circle, rectangle, square, hexagon, or other enclosed region. In an example, when satellite based location determination is available to the client device 110, the client device may send a message carrying position information of the location via the network communication connection to enable the ADDF 127 to retrieve the set of assistance data. In another example, when satellite based location determination is not available to the client device 110, the client device may send message carrying location request data via the network communication connection to enable the positioning engine server 130 to determine a location of the client device 110. Then, the ADDF 127 retrieves the set of assistance data in accordance with position information of the determined location. After the ADDF 127 has retrieved the set of assistance data contained in a defined geographical area, it delivers the set of assistance data to the client device 110 through the network communication connection.

The positioning engine server 130 is configured to process the location request data received from one or more client devices and calculate the locations of the client devices. The positioning engine server 130 may include a plurality of suitable components (not shown), such as a data retriever, a data processor, a location estimator, and the like, each of which acts to provide specific functionality. The positioning engine server 130 based on the plurality of suitable components performs the Positioning Data Retrieval Function (PDRF) 131 and Device Position Calculation Function (DPCF) 133, as it interacts with the client device 110.

The PDRF 131 can perform function of retrieving positioning data from the location database 150. According to an embodiment of the disclosure, when the client devices 110 send a message carrying location request data at a location to the positioning engine server 130 via the network communication connection, the PDRF 131 receives message carrying location request data and identifies the wireless station that is in communication with the client devices 110. If the wireless station can be identified as an entry in a wireless station information table 160, the PDRF 131 extracts a group of location data associated with the wireless station from the location database 150. Further, the PDRF 131 selects a subset in a group of the location data for the wireless station that has similar signal characteristic (e.g., received signal strength value in a same range) as the client devices 110 at its location. The location data in the selected subset is represented as positioning data.

The DPCF 133 can perform function of calculating a location of the client device 110. One or more of the positioning calculation modes may be supported. In an example, when the location request data comprises an identifier of a cellular station for providing wireless communication connection at the location and a characteristic of a wireless signal received at the location, the cellular network positioning mode is supported. In another example, when the location request data comprises an identifier of an access point for providing wireless communication connection at the location and a characteristic of a wireless signal received at the location, the WiFi network positioning mode is supported. According to an embodiment of the disclosure, the DPCF 133 determines position information of a location for the client device 110 based on the positioning data. Specifically, the location determination includes assigning a weight to each of locations in the positioning data and averaging the weighted locations to determine a location of the client device. Assigning a weight to each of locations can include assigning a weight to each of the latitudes and the longitudes of the locations. The weight of a location can be determined by a characteristic of a wireless signal received at the location (i.e., the strength of a signal received at the location) to the characteristics of the wireless signals (i.e., the strength of the signals) in the positioning data. Calculating the average location can include calculating an average of weighted latitudes and an average of weighted longitudes of locations, and designating a location at the calculated average latitude and the calculated average longitude as the location result for the client device. After the DPCF 133 has determined the location of the client device 110, it calculates an estimated uncertainty value associated with the determined location based on the statistical characterization of the positioning data. The estimated uncertainty value can differ from a location to a location, based on the population distribution pattern of the locations (e.g., number of the locations, density of the locations, and location concentration area) in the positioning data. In an example, an estimated uncertainty value can be sufficiently small where the locations are highly concentrated. The DPCF 133 may enable the positioning engine server 130 to send a responding message carrying the location result to the client device 110 through the network communication connection.

The location database 150 stores the previously obtained location data. According to an embodiment of the disclosure, each location data stores position information (e.g., latitude and longitude) for a location in association with wireless fingerprints (e.g., an identifier of a wireless station, and a characteristic of a wireless signal received from the wireless station) at the location. The location database 150 can be organized under a hierarchical folder structure, the folders mapping to directories in the file system. The location data can be stored in the location database of any suitable format. In an example, the location data are stored in a format to facilitate extracting a group of location data associated with a wireless station and to facilitate extracting a subset of location data from the group that has a specific signal characteristic. In an example, each group of location data associated with a wireless station is clustered into subsets according to clustering boundaries stored in a wireless station information table 160.

The function of the network communication interface is logically separated into data management communication interface and position determination communication interface. According to an embodiment of the disclosure, the network communication interface can be software for implementing HTTP. The HTTP message can be transported in the form of an HTTP POST. The HTTP message consists of header parameters and a message body. The message body is also referred to as the payload. In an example, the data management communication interface is used to enable the client device 110 to establish a communication with the data engine server 120. The location data can be contained in the message body of HTTP message. The message body is provided in a simple TXT-like format. In another example, the positioning determination communication interface is used to transport information used for the calculation of location between client device 110 and positioning engine server 130. The information can be contained in the message body of HTTP message. The message body is provided in a simple Extensive Makeup Language (XML)-like format.

Figure 2:
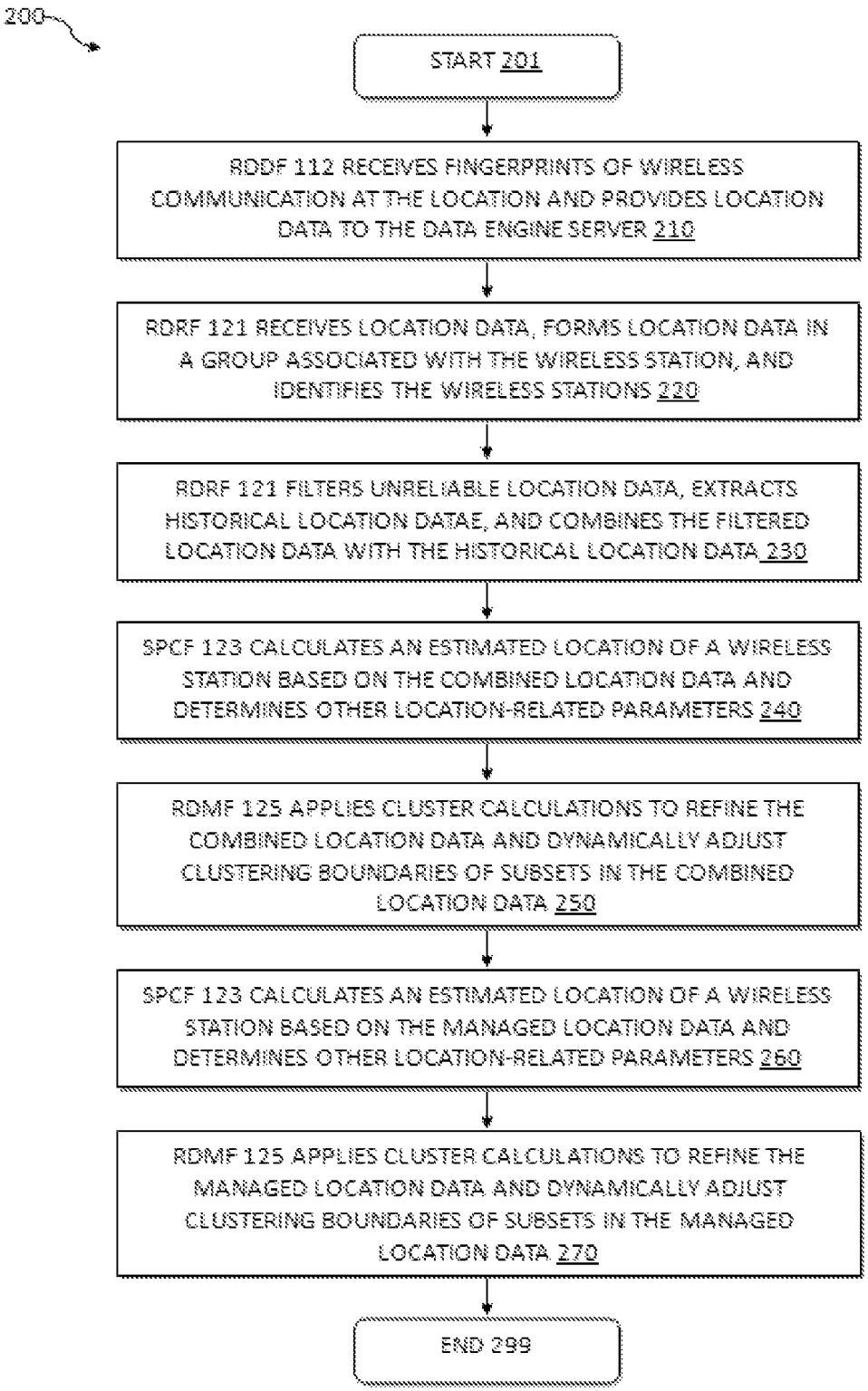
FIG. 2 is an example flowchart showing a data engine server processing location data according to an embodiment of the disclosure.

FIG. 2 is an example flowchart showing a data engine server processing location data with historical location data according to an embodiment of the disclosure. As shown in FIG. 2, exemplary process 200 will be illustrated between client device 110 and data engine server 120 that implements exemplary process 200. The process starts at 201 and proceeds to 210.

Suppose a user of the client device powers up the satellite positioning system receiver, an agent (not shown) installed in the client device 110 may receive a request for satellite based location determination from a client application (not shown) running on the client device 110 after the user of client device via a user interface clicked location consent to implement privacy function in the client device 110. The agent receives, from a satellite positioning system receiver, position information of a location, including a pair of a latitude coordinate and a longitude coordinate, an altitude, an orientation, a horizontal position error, and the like. Then, the agent forwards position information of a location to a location provider 115 installed in the client device 110.

At 210, the location provider 115 implements the RDDF 112 to generate location data and provide location data to the data engine server 120. The RDDF 112 receives, from a cellular transceiver and/or a wireless transceiver, fingerprints of wireless communication at the location, such as identifiers of wireless stations that are in wireless communication with the client device and characteristics of wireless signals at the location. In an example, the RDDF 112 receives a mobile country code (MCC), a mobile network code (MNC), a local area code (LAC), and a cell identifier (CID) from the cellular transceiver as an identifier of a cellular station received at the location. In another example, the RDDF 112 receives a media access control (MAC) address from the wireless transceiver as an identifier of an access point received at the location. In yet another example, the RDDF 112 receives the strength of the signal as characteristic of a wireless signal received at the location. The RDDF 112 prepares a HTTP message according to a data management communication interface. The HTTP message carries information to form a location data, such as the position information, an identifier of a wireless station and a characteristic of a wireless signal received at the location from the wireless station. Then, the client device 110 uses the domain provisioned by the network to establish a communication connection to the data engine server 120 and sends a HTTP message to start a procedure for providing location data to the data engine server 120. If the client device 110 is not already attached to packet data network services, it will attach itself. In an example, when the user with the client device moves on the trip (i.e., at different locations), the client device 110 have different wireless fingerprints, such as in communication with different wireless stations, having different values of the strength of the signal, and the like. The client device 110 can provide position information associated with wireless fingerprints at the different locations on the trip to the data engine server 120.

At 220, the data engine server 120 implements the RDRF 121 to identify location data once HTTP message has received. The RDRF 121 can parse HTTP message to retrieve the position information and the associated wireless fingerprints, such as an identifier of a wireless station and a value of the strength of the signal, and forms the location data in a group associated with the wireless station based on time periods. The RDRF 121 inspects the receiving identifiers with existing identifiers in a wireless station information table 160 to identify the wireless stations. During operations, when the data engine server 120 receives a HTTP request message, it may send a HTTP response message containing a status code to the client device 110 informing it that the procedure for processing location data is started.

At 230, the data engine server 120 implements the RDRF 121 to process location data once the wireless station is identified. The RDRF 121 extracts the basic information of the identified wireless station from the wireless station information table 160, filters unreliable location data associated with the identified wireless station based on the basic information (e.g., the coverage area length of a wireless station and the transmission signal range of a wireless station), extracts, from the location database 150, historical location data associated with the identified wireless station, and combines the filtered location data with the historical location data. The RDRF 121 forwards the combined location data to the SPCF 123 informing it that the procedure for calculating location determination is started.

At 240, the data engine server 120 implements the SPCF 123 to calculate an estimated location of a wireless station. The SPCF 123 calculates an estimated location of a wireless station based on the combined location data and determines other location-related parameters, such as the coverage area length of a wireless station, the transmission signal range of a wireless station, and the like, based on the statistical characterization of the combined location data. It is noted that the RDRF 121 and the SPCF 123 may exchange several successive procedures for location determination through internal communication. The SPCF 123 forwards the combined location data to the RDMF 125 informing it that the procedure for managing location data is started.

At 250, the data engine server 120 implements the RDMF 125 to manage the combined location data. The RDMF 125 can apply one or more cluster calculations to intelligently remove the junk data from a group of the combined location data. For an example, the cluster calculation uses cluster centers to model the group of the combined location data via iterative refinement approach and selects one or more clusters that may contain the junk data to be removed. Further, the RDMF 125 can assign the group of the combined location data into a plurality of subsets and can dynamically adjust clustering boundaries of subsets in the group of the combined location data such that the subsets of the group have relatively equal population. It is noted that the SPCF 123 and the RDMF 125 may exchange several successive procedures for location data management through internal communication.

Once the step 250 is implemented, the RDMF 125 forwards the managed location data to the SPCF 123 informing it that the procedure for calculating location determination is started. At 260, the SPCF 123 calculates an estimated location of a wireless station based on the managed location data and determines other location-related parameters based on the statistical characterization of the managed location data. It is noted that the RDRF 121 and the SPCF 123 may exchange several successive procedures for location determination through internal communication. The SPCF 123 forwards the managed location data to the RDMF 125 informing it that the procedure for managing location data is started. At 270, the RDMF 125 applies one or more cluster calculations to intelligently remove the junk data from a group of the managed location data. Further, the RDMF 125 assigns the group of the managed location data into a plurality of subsets and can dynamically adjust clustering boundaries of subsets in the group of the managed location data such that the subsets of the group have relatively equal population. It is noted that the SPCF 123 and the RDMF 125 may exchange several successive procedures for location data management through internal communication. The process proceeds to 299 and terminates.

Once the steps 260 through 270 are implemented, the RDMF 125 forwards the updated results to the RDRF 121 informing it that the basic information of wireless station in the wireless station information table 160 can be updated. Further, the RDMF 125 forwards the updated location data to the location database 150 informing it that the location data can be updated.

One skilled in the art would recognize that the flowchart of FIG. 2 may be referred as an example flowchart showing a data engine server 120 processing location data when there is no historical location data be extracted from the location database 150 according to an embodiment of the disclosure. At 210, the location provider 115 implements the RDDF 112 to generate location data and provide location data to the data engine server 120. The RDDF 112 prepares HTTP messages carrying location data according to a data management communication interface. At 220, the data engine server 120 implements the RDRF 121 to identify location data once HTTP messages have received. Because the location data cannot be identified in the location database 150, the process proceeds to 240. At 240, the data engine server 120 implements the SPCF 123 to calculate an estimated location of a wireless station. At 250, the data engine server 120 implements the RDMF 125 to manage the location data refinement and location data distribution. At 260, the data engine server 120 implements the SPCF 123 to calculate an estimated location of a wireless station based on the managed location data. At 270, the data engine server 120 implements the RDMF 125 to manage the location data refinement and location data distribution. Once the steps 260 through 270 are implemented, the RDMF 125 forwards the updated results to the RDRF 121 informing it that the basic information of wireless station can be generated as a new entry in the wireless station information table 160. Further, the RDMF 125 forwards the updated location data to the location database 150 informing it that the location data can be stored as a new one.

Figure 3:
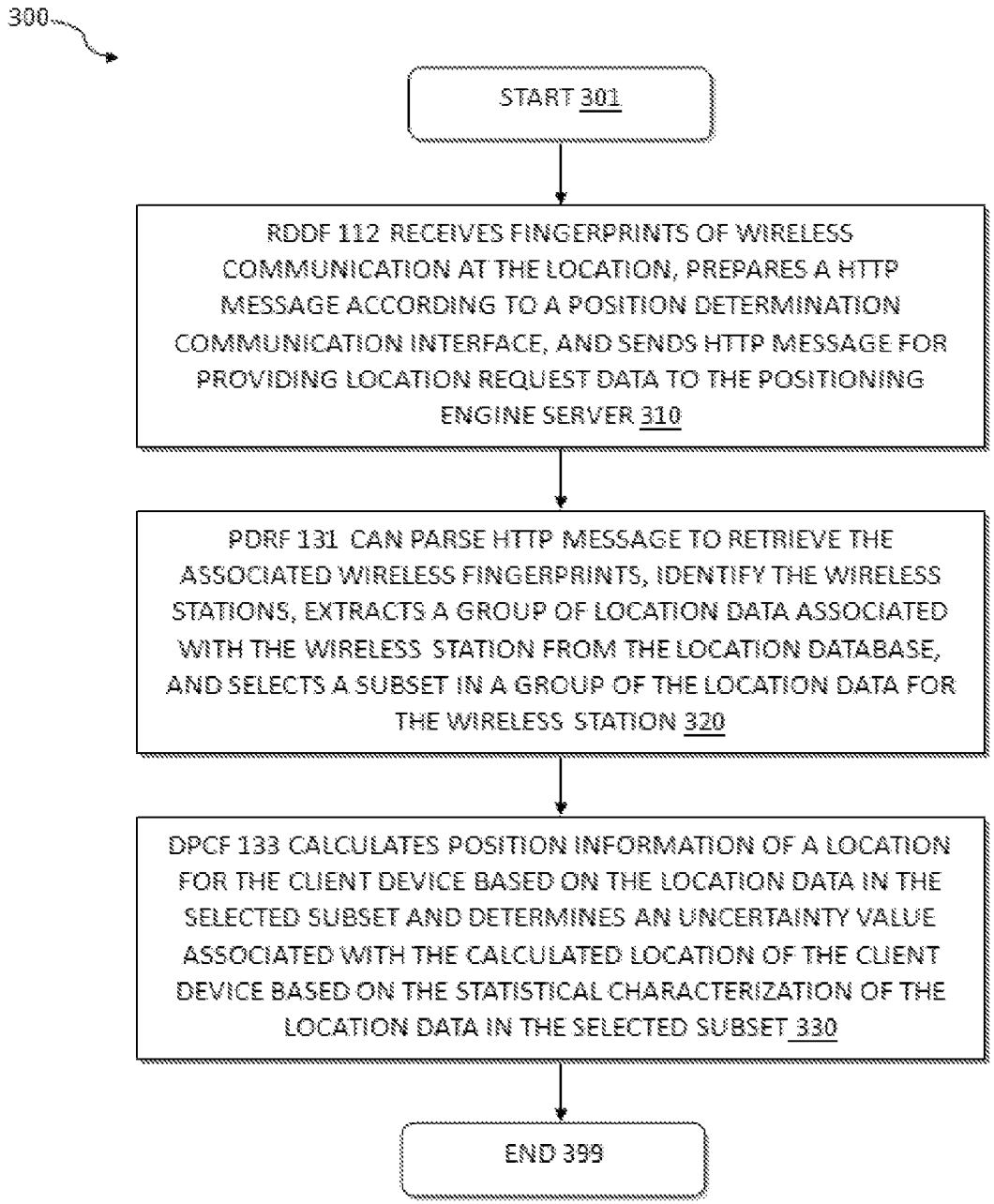
FIG. 3 is an example flowchart showing a positioning engine server determining a location of the client device according to an embodiment of the disclosure.

FIG. 3 is an example flowchart showing a positioning engine server determining a location of the client device according to an embodiment of the disclosure. As shown in FIG. 3, exemplary process 300 will be illustrated between client device 110 and positioning engine server 130 that implements exemplary process 300. The process starts at 301 and proceeds to 310.

Suppose a user of the client device does not power up the satellite positioning system receiver, but has a need of knowing its location, a location provider 115 installed in the client device 110 may receive a request for location determination from a client application (not shown) running on the client device 110 after the user of client device via a user interface clicked location consent to implement privacy function in the client device 110.

At 310, the location provider 115 implements the RDDF 112 to generate location request data and provide location request data to the positioning engine server 130. The RDDF 112 receives fingerprints of wireless communication at the location from a cellular transceiver and/or a wireless transceiver. The RDDF 112 prepares a HTTP message according to a position determination communication interface. The HTTP message carries information to form a location request data, such as an identifier of a wireless station and a characteristic of a wireless signal received at the location from the wireless station. The HTTP message may include HTTP GET or HTTP POST. For example, the effective load of the location determination request message includes HTTP parameters when a HTTP POST request is used. The effective load of the location determination request message may include a class format structure that contains XML, JavaScript Object Notation (JSON) or any other appropriate user-defined formats. The format structure of XML includes texts, integer data or floating point data. A root tag may contain two sub-tags for distinguishing different types of location determination request messages: C and W, which represent cellular based location request data and WiFi based location request data respectively. An example POST message for the cellular based location request data is as follows:

POST /XXXXXXX/TopStar HTTP/1.1

<C><M>data elements in integer</M><N>data elements in integer </N><L>data elements in integer</L><C>data elements in integer</C><R>data elements in integer</R></C>

POST /XXXXXXX/TopStar HTTP/1.1

An example POST message for the WiFi based location request data is as follows:

POST /XXXXXXX/TopStar HTTP/1.1

<W><M>data elements in integer</M><A>data elements in text</A><Rx>data elements in integer</Rx><W>

Then, the client device 110 uses the domain provisioned by the network to establish a communication connection to the positioning engine server 130 and sends a location determination request message to start a procedure for providing location request data to the positioning engine server 120. If the client device 110 is not already attached to packet data network services, it will attach itself. It should be noted that if a previously computed location which meets the requested quality of position (QoP) is available at the location provider 115, the location provider 115 shall respond with a message carrying position information of a location to the client application and stop the communication connection.

At 320, the positioning engine server 130 implements the PDRF 131 to retrieve positioning data from the location database 150 after HTTP POST message has received. The PDRF 131 can parse HTTP POST message carrying location request data to retrieve the associated wireless fingerprints, such as an identifier of a wireless station and a value of the strength of the signal, and inspects the receiving identifiers with existing identifiers in a wireless station information table 160 to identify the wireless stations. If the wireless station can be identified as an entry in the wireless station information table 160, the PDRF 131 extracts a group of location data associated with the wireless station from the location database 150. The PDRF 131 selects a subset in a group of the location data for the wireless station that has similar signal characteristic (e.g., received signal strength value in a same range) as the client devices 110 at its location. The location data in the selected subset is represented as positioning data. The PDRF 131 forwards the positioning data to the DPCF 133 informing it that the procedure for calculating location determination is started.

At 330, the positioning engine server 130 implements the DPCF 133 to calculate a location of the client device 110. The DPCF 133 calculates position information of a location for the client device 110 based on the positioning data and determines an uncertainty value associated with the calculated location based on the statistical characterization of the positioning data. It is noted that the PDRF 131 and the DPCF 133 may exchange several successive procedures for location determination through internal communication. The process proceeds to 399 and terminates.

Once the step 330 is implemented, The DPCF 133 prepares a HTTP message according to a position determination communication interface. The HTTP message carries information to form a location response data, such as the determined location and associated uncertainty location error. The HTTP message may include HTTP GET or HTTP POST. For example, the payload of the location determination response message includes HTTP parameters when a HTTP POST response is used. The payload of the location determination response message may include a format structure which contains XML, JSON, or any other appropriate custom formats. The format structure of XML includes texts, integer data or floating point data. A root tag may contain two sub-tags for distinguishing different types of location response messages: C and W, which represent cellular based location response data and WiFi based location response data respectively. An example POST message of the cellular based location response data is as follows:

HTTP/1.1 200 OK

Content-Type: Application/Octet-Stream

Content-Length: Length of body

<C><r>data elements in text</r><d><o>data elements in float</o><t>data elements in float</t><u>data elements in integer</u></d></C>

An example POST message of the WiFi based location response data is as follows:

HTTP/1.1 200 OK

Content-Type: Application/Octet-Stream

Content-Length: Length of body

<W><r>data elements in text</r><d><o>data elements in float</o><t>data elements in float</t><u>data elements in integer</u></d></W>

Then, the positioning engine server 130 uses the domain provisioned by the network to establish a communication connection to the client device 110 and sends HTTP message containing a status code to the client device 110 informing it that no further procedure for location determination will be started. In an example, when a location determination response message is processed successfully, a response status code is 200 and a response reason phrase is 'OK'. In another example, when a location determination response message is not processed successfully, then the response message contains error information.

One skilled in the art would recognize that the flowchart of FIG. 3 may be referred as an example flowchart showing a positioning engine server 130 determining a location of the client device 110 when there is no positioning data be extracted from the location database 150 according to an embodiment of the disclosure. At 310, the location provider 115 implements the RDDF 112 to generate location request data and provide location request data to the positioning engine server 130. The RDDF 112 prepares a HTTP message carrying location request data according to a position determination communication interface. At 320, the positioning engine server 130 implements the PDRF 131 to retrieve positioning data after HTTP message has received. Because the location request data cannot be identified in the location database 150, or an error on the positioning engine server 130 is occurred, the positioning engine server 130 uses the domain provisioned by the network to establish a communication connection to the client device 110 and sends HTTP message containing a status code to the client device 110 informing it that no further procedure for location determination will be started.

Figure 4:
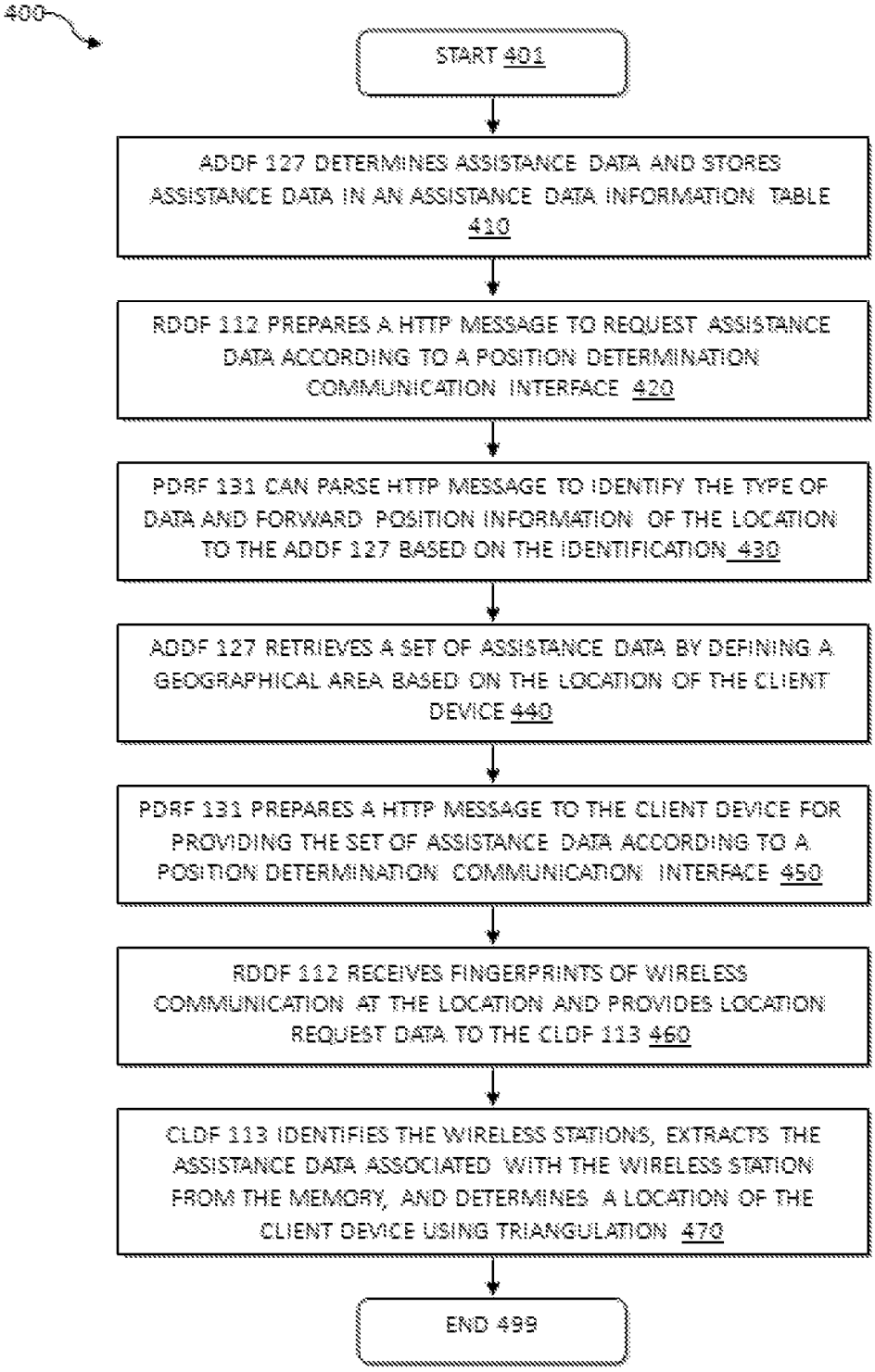
FIG. 4 is an example flowchart showing a client device determining a location of the client device according to an embodiment of the disclosure.

FIG. 4 is an example flowchart showing a client device determining a location of the client device according to an embodiment of the disclosure. As shown in FIG. 4, exemplary process 400 will be illustrated between client device 110 and data engine server 130 that implements exemplary process 400. The process starts at 401 and proceeds to 410.

At 410, the data engine server 120 implements the ADDF 127 to determine assistance data and store assistance data in an assistance data information table 170. Each assistance data can include an identifier of a wireless station in association with position information of a location for the wireless station, the polynomial coefficients, and a workable range of characteristics of wireless signal.

At 420, the location provider 115 implements the RDDF 112 to request assistance data. The RDDF 112 prepares a HTTP message according to a position determination communication interface. The HTTP message carries a data. In an example, HTTP message carries position information of the location when satellite based location determination is available to the client device 110. In another example, HTTP message carries location request data, such as an identifier of a wireless station and a characteristic of a wireless signal received at the location from the wireless station when satellite based location determination is not available to the client device 110. When a HTTP POST request is used, the effective load of the assistance data request message includes HTTP parameters and a class format structure that contains XML, JSON, or any other appropriate user-defined formats. The format structure of XML may include texts, integer data or floating point data. A root tag may contain two sub-tags for distinguishing different types of assistance data request messages: C and W, which represent cellular based assistance data and WiFi based assistance data respectively.

At 430, the positioning engine server 130 implements the PDRF 131 to identify the type of data once HTTP POST message has received. The PDRF 131 can parse HTTP POST message carrying data. If the data is a type of position information of the location, the PDRF 131 forwards position information of the location to the ADDF 127 informing it that the procedure for retrieving assistance data is started. If the data is a type of location request data, the PDRF 131 retrieves positioning data from the location database 150 and forwards positioning data to the DPCF 133 for calculating a location of the client device. Then, the DPCF 133 forwards the determined location of the client device to the ADDF 127 informing it that the procedure for retrieving assistance data is started.

At 440, the data engine server 120 implements the ADDF 127 to retrieve a set of assistance data. The set of assistance data contained in a defined geographical area can be retrieved. The geographical area depicted by a circle, rectangle, square, hexagon, or other enclosed region can be defined based on position information of a location for the client device 110. After the ADDF 127 has retrieved the set of assistance data, it forwards the set of assistance data to the PDRF 131 informing it that the procedure for providing the set of assistance data to the client device 110 is started.

At 450, the PDRF 131 prepares a HTTP message according to a position determination communication interface. The HTTP message carries a set of assistance data. The payload of the assistance data response message includes HTTP parameters when a HTTP POST response is used. The payload of the assistance data response message may include a format structure which contains XML, JSON, or any other appropriate custom formats. The format structure of XML includes texts, integer data or floating point data. A root tag may contain two sub-tags for distinguishing different types of location response messages: C and W, which represent cellular based assistance data and WiFi based assistance data respectively.

Once the step 450 is implemented, the client device 110 receives and stores the set of assistance data in a memory (not shown). In an example, the memory can be a non-volatile memory such that the data it contains can be immediately used when there is a need in the art for the client device 110 that determines location service. Suppose a user of the client device does not power up the satellite positioning system receiver, but has a need of knowing its location, a location provider 115 installed in the client device 110 may receive a request for location determination from a client application (not shown) running on the client device 110 after the user of client device via a user interface clicked location consent to implement privacy function in the client device 110.

At 460, the location provider 115 implements the RDDF 112 to generate location request data and provide location request data. The RDDF 112 receives fingerprints of wireless communication at the location from a cellular transceiver and/or a wireless transceiver. The RDDF 112 forwards fingerprints of wireless communication at the location to the CLDF 113 informing it that the procedure for calculating location determination is started.

At 470, the location provider 115 implements the CLDF 113 to calculate a location of the client device 110. The CLDF 113 inspects the receiving identifiers with existing identifiers in a memory to identify the wireless stations. In an example, when the wireless station can be identified as an entry in the memory, the CLDF 113 can extract the assistance data associated with the wireless station. The CLDF 113 uses polynomial coefficients to relate one or more distances between a client device and one or more wireless stations when characteristics of wireless signals received at the location is within the workable range. The CLDF 113 determine a location of the client device 110 using the locations of the wireless stations to which the client device can communicate wirelessly, by triangulating its position based on the related distances. In another example, when the wireless station cannot be identified as an entry in the memory, the location provider 115 implements the location determination with reference to FIG. 3.

The features as described in reference to FIGS. 1-4 can be implemented in one or more computer programs that are performed by a processing system, including at least one programmable processor coupled to received data and instructions from, and to transmit data and instructions, to a data storage system, at least one input device, and at least one output device. A computer program is sets of instructions that can be used, directly or indirectly, in a computer to perform a certain activity or bring about a certain result. A computer program can be written in any form of programming language (e.g., Java, Objective-C), including compiled or interpreted languages, and can be deployed in any form, including as a stand-alone program or as a module, component, a browser-based web application, or other unit suitable for use in a computing environment.

The features can be performed in a computer system that can include a back-end component, or that can include a middleware component, or that can include a front-end component. The components of the system can be connected by any form or medium of data communication networks. In some implementations, communication networks can include a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method comprising:

performing, by one or more servers:

receiving, from client devices, messages indicating data entries, each data entry identifying (i) an identification of a location of a respective one of the client devices, the location identification being determined by the respective client device and in terms of geographic coordinates, (ii) an identifier of a wireless station from which the respective client device received a signal at the determined location, and (iii) a strength of the received signal;

storing the data entries in a database;

selecting a set of the data entries that identify a first wireless station from among the wireless stations;

calculating an estimated location of the first wireless station as an average of the location identifications of the selected set of data entries;

determining, from the set of the data entries, (i) an uncertainty of the estimated location for the first wireless station, (ii) a coverage area of the first wireless station, and (iii) a transmission signal range of the first wireless station;

determining a location of a requesting client device by:

receiving, from the requesting client device, a location request that includes (i) an identifier of the first wireless station through which the requesting client device is communicating, and (ii) a signal strength of a signal received from the first wireless station;

selecting a subset of the data entries, based on the subset of the data entries (i) identifying the first wireless station and (ii) identifying a signal strength that is in a same range as the signal strength included in the location request; and calculating a location of the requesting client device as a weighted average of the location identifications in the subset, with a weighting factor that is, for each respective data entry of the subset, (i) applied to the geographic coordinates of the respective data entry and (ii) inversely related to a difference between the signal strength included in the location request and the signal strength of the respective entry.

2. The method of claim 1, wherein the average is a weighted average, with a weighting factor that is, for each respective data entry of the set, (i) applied to the geographic coordinates of the respective data entry and (ii) related to the signal strength of the respective data entry.

3. The method of claim 1, wherein the uncertainty is determined by applying circular error probable (CEP) theory to calculate 95% radius of the estimated location of the first wireless station, and the uncertainty reflects a confidence of estimated location.

4. A method comprising:

performing, by one or more servers:

receiving, from client devices, messages indicating data entries, each data entry identifying an identification of a location of a respective one of the client devices, the location identification being determined by the respective client device and in terms of geographic coordinates, an identifier of a wireless station from which the respective client device received a signal at the determined location, and a strength of the received signal;

storing the data entries in a database;

selecting a set of the data entries that identify a first wireless station from among the wireless stations;

calculating an estimated location of the first wireless station as an average of the location identifications of the selected set of data entries;

determining, from the set of the data entries, an uncertainty of the estimated location for the first wireless station, a coverage area of the first wireless station, and a transmission signal range of the first wireless station; and providing polynomial coefficients by:

for each respective data entry that is of a subset of the data entries that indicate the identifier of the first wireless station, calculating a distance from the location identifier of the respective data entry to the first wireless station;

calculating the polynomial coefficients using polynomial regression based on the calculated distances as a function of the corresponding signal strengths indicated by entries of the subset, for the polynomial coefficients to be used in a polynomial equation that defines distance from the first wireless station as a function of signal strength; and forwarding, to a requesting client device, the polynomial coefficients and the estimated location of the first wireless station.

5. The method of claim 4, further comprising the one or more servers selecting the subset by:

receiving, from the requesting client device, a location request that includes (i) an identifier of the first wireless station through which the requesting client device is communicating, and (ii) a signal strength of a signal received from the first wireless station; and selecting the subset of the data entries based on each data entry of the subset (i) identifying the first wireless station and (ii) identifying a signal strength that is in a same range as the signal strength included in the location request.

6. The method of claim 4, further comprising the requesting client device:

receiving a signal from the first wireless station;

measuring a signal strength from of the received signal; and using the polynomial coefficients in the polynomial equation to calculate a distance of the client device from the first wireless station's estimated location as a function of measured signal strength.

7. The method of claim 4, further comprising the requesting client device:

receiving, from the server, for each of a second wireless station and a third wireless station, polynomial coefficients and an estimated location of the respective wireless station;

receiving respective signals from the first, second and third wireless stations;

measuring respective signal strengths from of the received respective signals;

using the polynomial coefficients the polynomial equations to calculate a distance of the requesting client device from the estimated location of each of the first, second and third wireless stations; and using the distances to determine a location of the requesting client device through triangulation.

8. The method of claim 4, wherein the calculating of the distances and the calculating of the polynomial coefficients is performed by the one or more servers for each of multiple subsets of the data entries that indicate the identifier of the first wireless station.

9. The method of claim 1, wherein the estimated location of the wireless station does not correspond to an actual location of the wireless station.

10. A system comprising:

one or more servers configured to perform:

receiving, from client devices, messages indicating data entries, each data entry identifying (i) an identification of a location of a respective one of the client devices, the location identification being determined by the respective client device and in terms of geographic coordinates, (ii) an identifier of a wireless station from which the respective client device received a signal at the determined location, and (iii) a strength of the received signal;

storing the data entries in a database;

selecting a set of the data entries that identify a first wireless station from among the wireless stations;

calculating an estimated location of the first wireless station as an average of the location identifications of the selected set of data entries;

determining, from the set of the data entries, (i) an uncertainty of the estimated location for the first wireless station, (ii) a coverage area of the first wireless station, and (iii) a transmission signal range of the first wireless station; and providing polynomial coefficients by:

for each respective data entry that is of a subset of the data entries that indicate the identifier of the first wireless station, calculating a distance from the location identifier of the respective data entry to the first wireless station;

calculating the polynomial coefficients using polynomial regression based on the calculated distances as a function of the corresponding signal strengths indicated by entries of the subset, for the polynomial coefficients to be used in a polynomial equation that defines distance from the first wireless station as a function of signal strength; and forwarding, to a requesting client device, the polynomial coefficients and the estimated location of the first wireless station.

11. The system of claim 10, wherein the average is a weighted average, with a weighting factor that is, for each respective data entry of the set, (i) applied to the geographic coordinates of the respective data entry and (ii) related to the signal strength of the respective data entry.

12. The system of claim 10, wherein the uncertainty is determined by applying circular error probable (CEP) theory to calculate 95% radius of the estimated location of the first wireless station, and the uncertainty reflects a confidence of estimated location.

13. A system comprising:

one or more servers configured to perform:

receiving, from client devices, messages indicating data entries, each data entry identifying an identification of a location of a respective one of the client devices, the location identification being determined by the respective client device and in terms of geographic coordinates, an identifier of a wireless station from which the respective client device received a signal at the determined location, and a strength of the received signal;

storing the data entries in a database;

selecting a set of the data entries that identify a first wireless station from among the wireless stations;

calculating an estimated location of the first wireless station as an average of the location identifications of the selected set of data entries;

determining, from the set of the data entries, an uncertainty of the estimated location for the first wireless station, a coverage area of the first wireless station, and a transmission signal range of the first wireless station;

providing polynomial coefficients by:

for each respective data entry that is of a subset of the data entries that indicate the identifier of the first wireless station, calculating a distance from the location identifier of the respective data entry to the first wireless station;

calculating the polynomial coefficients using polynomial regression based on the calculated distances as a function of the corresponding signal strengths indicated by entries of the subset, for the polynomial coefficients to be used in a polynomial equation that defines distance from the first wireless station as a function of signal strength; and forwarding, to a requesting client device, the polynomial coefficients and the estimated location of the first wireless station.

14. The system of claim 13, wherein the one or more servers are configured to select the subset by:

receiving, from the requesting client device, a location request that includes (i) an identifier of the first wireless station through which the requesting client device is communicating, and (ii) a signal strength of a signal received from the first wireless station; and selecting the subset of the data entries based on each data entry of the subset (i) identifying the first wireless station and (ii) identifying a signal strength that is in a same range as the signal strength included in the location request.

15. The system of claim 13, further comprising the requesting client device, wherein the requesting client device is configured to use the polynomial coefficients by:

receiving a signal from the first wireless station;

measuring a signal strength from of the received signal; and using the polynomial coefficients in the polynomial equation to calculate a distance of the client device from the first wireless station's estimated location as a function of measured signal strength.

16. The system of claim 13, further comprising the requesting client device, wherein the requesting client device is configured to use the polynomial coefficients by:

receiving, from the server, for each of a second wireless station and a third wireless station, polynomial coefficients and an estimated location of the respective wireless station;

receiving respective signals from the first, second and third wireless stations;

measuring respective signal strengths from of the received respective signals;

using the polynomial coefficients the polynomial equations to calculate a distance of the requesting client device from the estimated location of each of the first, second and third wireless stations; and using the distances to determine a location of the requesting client device through triangulation.

17. The system of claim 13, wherein the calculating of the distances and the calculating of the polynomial coefficients is performed by the one or more servers for each of multiple subsets of the data entries that indicate the identifier of the first wireless station.

18. The system of claim 10, wherein the estimated location of the wireless station does not correspond to an actual location of the wireless station.

* * * * *